US006827534B2

(12) United States Patent
Onken

(10) Patent No.: US 6,827,534 B2
(45) Date of Patent: Dec. 7, 2004

(54) AIR RETURN BULKHEAD

(75) Inventor: Gregory L. Onken, Madison, WI (US)

(73) Assignee: Illinois Tool Works Ltd., Glenview, IL (US)

( * ) Notice: Subject to any disclaimer, the term of this patent is extended or adjusted under 35 U.S.C. 154(b) by 0 days.

(21) Appl. No.: 10/671,515

(22) Filed: Sep. 29, 2003

(65) Prior Publication Data

US 2004/0072530 A1 Apr. 15, 2004

Related U.S. Application Data

(63) Continuation of application No. 09/797,905, filed on Mar. 5, 2001, now Pat. No. 6,626,753, which is a continuation of application No. 09/413,350, filed on Oct. 6, 1999, now Pat. No. 6,203,419, which is a continuation of application No. 09/118,566, filed on Jul. 17, 1998, now Pat. No. 5,993,310, which is a continuation of application No. 08/607,229, filed on Feb. 26, 1996, now Pat. No. 5,807,046.

(51) Int. Cl.[7] .............................................. B60P 7/135
(52) U.S. Cl. ........................ 410/129; 62/239; 62/263; 62/297; 410/121; 454/118
(58) Field of Search .............................. 454/88, 90, 91, 454/92, 118; 62/239, 407, 413, 414; 410/121, 129, 140; 220/1.5

(56) References Cited

U.S. PATENT DOCUMENTS

RE36,214 E * 6/1999 Podd et al. .................. 220/1.5

* cited by examiner

Primary Examiner—Harold Joyce
(74) Attorney, Agent, or Firm—Banner & Witcoff, Ltd.

(57) ABSTRACT

An air return bulkhead is disclosed which may be adapted to fit on differently-sized trailer walls around differently-sized trailer refrigeration units. The bulkhead includes an upper support panel with ridges or other discontinuities thereon. The discontinuities bound areas sized to accommodate standard refrigeration units, and a cutting tool may be easily guided along these discontinuities to form a space wherein the refrigerator may be fit when the bulkhead is mounted to the trailer wall. Also disclosed is a bulkhead which includes flutes and columns thereon wherein the ends of the flutes and columns may be removed by use of a cutting tool to allow the bulkhead installer to tailor the airflow into the refrigerator inlet as desired.

38 Claims, 6 Drawing Sheets

AIR RETURN BULKHEAD

CROSS-REFERENCE TO RELATED APPLICATIONS

This application claims priority under 35 USC § 120 to U.S. patent application Ser. No. 08/607,229 filed Feb. 26, 1996, the entirety of which is incorporated by reference herein.

FIELD OF THE INVENTION

The present invention relates generally to air return bulkheads for trailers for insuring proper flow of refrigerated air therein, and more specifically to universal-mount air return bulkheads which may be rapidly modified to fit on different trailer wails with differently-sized makes and models of refrigeration units thereon.

DESCRIPTION OF THE PRIOR ART

Refrigerated trailers are commonly used to transport perishable cargo on roadways in order to distribute the cargo to consumers in a fresh condition. These refrigerated trailers are specially designed for effective cooling of the cargo. The refrigeration unit for the trailer is generally mounted on the front wall of the trailer with a portion protruding into the interior of the trailer. The refrigerator inlet is located on the lower portion of the refrigerator adjacent the trailer interior front wall, and the refrigerator outlet is located on the top portion of the refrigerator near the trailer ceiling. As a result, warmer air is pulled from the trailer front wall, cooled, and blown along the ceiling of the trailer toward the trailer rear wall. The cargo is stacked on the trailer floor so that it is spaced from the trailer ceiling and the walls of the trailer. The floor of the trailer may be a false floor with a space located beneath, or as illustrated by the drawings in U.S. Pat. No. 2,923,384 to Black, the trailer floor may comprise a series of rails, ridges, or similar raised structures with lengths oriented from the front of the trailer to the rear of the trailer. In either case, the floor supports the cargo but allows refrigerated air to flow rearward along the trailer ceiling, along the trailer rear wall, and beneath the cargo and toward the front of the trailer. The refrigerator inlet then pulls the air in so that it may be recooled and again ejected rearwardly along the trailer ceiling. This cooling methodology allows a steady recirculating flow of refrigerated air to surround the entirety of the cargo, thereby keeping it at a cold temperature.

However, it has been found that cargo can sometimes shift during transport and slide against the front or rear wall of the trailer to block the circulating air. To prevent this problem, a bulkhead including a series of ribs or ridges thereon is frequently mounted to the front wall below the refrigerator inlet. This bulkhead, which is often called a "lattice-type" air return bulkhead, preserves the passage of air to the refrigerator inlet along the front wall even if cargo shift against it. The spacing between the ridges is such that cargo cannot fit therein, thereby preventing shifting cargo from moving between or behind the ridges and obstructing the circulation of air. The lattice type air return bulkhead may even extend over the refrigerator and toward the trailer ceiling to protect the refrigerator from damage from shifting cargo. One lattice-style air return bulkhead sold by Donovan Enterprises (LaGrange, Ga.) includes a series of vertically-oriented beams mounted to the trailer front wall below and adjacent to the refrigerator. A number of spaced horizontally-oriented slats are mounted to the beams to form a web-like slat framework spaced from the front wall of the trailer. Air can thereby flow from the floor between the beams and into the refrigerator inlet. The slats prevent cargo from shifting between the beams and blocking air flow. A similar lattice-style air return bulkhead is sold by Aero Industries (Indianapolis, Ind.).

However, when some types of lattice-style bulkheads are used, there is a possibility that cargo adjacent the refrigerator can shift so that spaces between the cargo provide an air passage between the bottom and top of the refrigerator. Air exiting the refrigerator outlet near the ceiling of the trailer can then be pulled directly downward toward the front wall of the trailer, through the lattice of the bulkhead, and back into the refrigerator inlet, rather than circulating through the trailer by flowing along the trailer ceiling towards the trailer's rear wall. This phenomenon, known as "short cycling" sends freshly cooled air into the refrigerator inlet and causes the thermostat in the refrigerator inlet to misread the air temperature in the trailer. The refrigerator then shuts down prematurely, resulting in product thawing and unsafe temperatures for foodstuffs.

To reduce the problem of short cycling, much of the trucking industry has been switching to "solid-style" or "false wall" air return bulkheads, which provide a solid, continuous wall spaced a short distance from the front wall of the trailer and surrounding the refrigerator inlet. The false wall air return bulkhead is opened near the floor of the trailer to allow air to flow from the trailer floor, behind the bulkhead wall, and into the refrigerator inlet. Because the false wall air return bulkhead provides a barrier between the refrigerator inlet and outlet and an effective refrigerator inlet near the trailer floor, the air exiting from the refrigerator cannot re-enter the refrigerator inlet unless it circulates throughout the mailer first. As a result, the false wall air return bulkheads work quite well in preventing short cycling. A summary of prior art false wall air return bulkheads follows.

U.S. Pat. No. 3,206,946 to Lindersmith et al. illustrates a false wall air return bulkhead which includes two parallel panels connected in spaced relation by a number of support beams. One panel (the "wall panel") is attached to the trailer front wall so that the other panel (the "floating panel") is maintained in spaced relation from the trailer front wall. Warm air from the floor passes between the panels to reach the refrigerator inlet. A series of vertically oriented, generally sinusoidal indentations or flutes are included in the floating panel to enhance heat transfer from the air passing between the panels to the air in the remainder of the trailer.

U.S. Pat. No. 5,427,237 to Kiefer et al. discloses a shipping crate for a refrigeration unit which may be converted to a false wall air return bulkhead. The resulting bulkhead utilizes side rib members which fit vertically on the trailer front wall on either side of the refrigerator, and central rib members which are placed at a diagonal on the trailer front wall beneath the refrigerator inlet. A planar floating panel is then attached to these rib members so that it is supported in spaced relation to the trailer front wall and so that it covers the lower portion of the refrigerator and the refrigerator inlet, thereby isolating the refrigerator inlet from the refrigerator outlet. Pallet stops in the form of C-shaped bumpers are then placed beneath the panel between the panel and the floor. These pallet stops prevent pallets or other cargo from shifting forward during transport, moving under the panel, and blocking air flow to the refrigerator inlet. The pallet stops also prevent pallets or other cargo from sliding beneath the panel and possibly catching and damaging the panel when the cargo is later lifted out of the trailer for removal.

U.S. Pat. No. 4,399,737 to Severson illustrates a false wall air return bulkhead having a floating panel spaced from the trailer front wall. Side support panels descend from the sides of the floating panel and extend into abutment with the trailer front wall near the trailer side walls. Corrugations or flutes are depressed into the floating panel between the panel and the trailer front wall. The top of the floating panel is placed in abutment with the refrigerator adjacent the refrigerator inlet. Supplementary panels or extension members are then attached to the top of the floating panel on both sides of the refrigerator to isolate the refrigerator inlet and prevent air exiting the refrigerator outlet from re-entering the inlet. These supplementary panels may include apertures at their sides to allow air adjacent the side walls of the trailer to flow inward towards the refrigerator inlet. The bulkhead is made in several different heights, and the supplementary panels can have several different widths. This allows the bulkhead to be fitted onto differently-sized trailer front walls around differently-sized refrigerators. The bulkhead components are generally constructed of KEVLAR-reinforced fiberglass/plastic composite.

The AERGUARD air return bulkhead (Aero Industries, Indianapolis, Ind.), includes a number of Z-shaped beams which are vertically mounted on the trailer front wall below the refrigerator inlet and near the trailer side walls. Elongated top and bottom floating panels are then mounted horizontally across the tops and bottoms of the beams to leave a central aperture between the beams. A fiberglass reinforced plywood center floating pane is then bolted to the beams between the top and bottom panels to close the central aperture. Bumpers or pallet stop are placed between the bottom of the beams and the floor. Supplementary panels are then placed on top of the top panel on both sides of the refrigerator to complete a barrier between the refrigerator inlet and outlet. A mesh screen may be fit around the inlet portion of the bulkhead, i.e. between the lower panel and the trailer floor and trailer front wall, to prevent debris from entering the refrigerator. A variety of differently-sized bulkheads are sold to allow the bulkheads to be used with differently-sized refrigerators.

An air return bulkhead sold by Donovan Enterprises (LaGrange, Ga.) is somewhat similar to the AERGUARD air return bulkhead noted above. Metal beams are vertically mounted on the trailer front wall near the trailer side walls. A fiberglass reinforced floating panel is mounted to these beams in spaced relation to the front wall. Supplementary panels are then mounted to the top of the floating panel on both sides of the refrigerator to complete a barrier between the refrigerator inlet and outlet.

The prior art also illustrates a "hybrid" air return bulkhead which incorporates features of both lattice and false wall bulkheads. The AIRHEAD air return bulkhead (Air Flo Products, Madison, Wis.) is a lattice-style bulkhead integrally formed of high density polyethylene. The AIRHEAD bulkhead essentially consists of a planar wall panel with a series of raised parallel columns thereon. The wall panel is mounted to the tailer front wall beneath a refrigerator so that the columns are oriented vertically, thereby allowing air to flow between the columns from the trailer floor to the refrigerator inlet. The ends of the columns include acres so that air can also flow within the columns themselves. Thus, the columns are arranged in a lattice formation, but each column in itself forms a floating wall. The columns are horizontally spaced to such an extent that cargo cannot shift to block air flow between the columns.

However, the prior art air return bulkheads generally tend to have one or more of the following disadvantages.

First, owing to their web-like, largely open structure, the lattice-style prior art air return bulkheads allow air to flow directly against cargo in abutment with the bulkhead, thereby more fully cooling this cargo. However, as noted above, the lattice-style prior art bulkheads can also allow refrigerated air to pass directly from the refrigerator outlet to the refrigerator inlet, resulting in short cycling. False wall air return bulkheads largely prevent short cycling, but at the same time they do not allow refrigerated air to flow directly against cargo adjacent the false wall. As a result, false wall bulkheads may not cool cargo adjacent the bulkhead as efficiently as lattice-style bulkheads. The art is in need of an air return bulkhead which allows efficient cooling of cargo adjacent the bulkhead, but which prevents the occurrence of short cycling at the same time.

Second, the prior art air return bulkheads are time-consuming to assemble and install. Assembly time represents lost trailer use and economic loss, and for that reason, the art has long been seeking bulkheads which may be rapidly and easily assembled, as well as disassembled and replaced. This long-felt need for an air return bulkhead with lesser installation time is evidenced, for example, by the sales literature for the prior art bulkheads noted above. Such sales literature inevitably touts the installation time of the particular bulkhead to which it pertains. Thus far, a one-hour installation time for a bulkhead has been viewed favorably by trailer owners.

Third, most of the prior art air return bulkheads are not well adapted for convenient display by retailers. Because the prior art bulkheads are somewhat large, retailers generally do not have sufficient space to stock all of the varieties of bulkheads needed to fit all of the different varieties of trailers and refrigerators. At the same time, owing to the wide variety in trailer and refrigerator sizes, it is necessary that the retailer carry a large number of differently-sized bulkheads in order to ensure that a properly fitting bulkhead will be on hand when a trailer owner asks for it. If a properly sized bulkhead is not available, the trailer owner must generally wait two or three weeks for a properly sized bulkhead to be delivered. If the trailer cannot be used in the meantime, this can represent a significant economic loss to the trailer owner.

Fourth, the prior art air return bulkheads are not designed for point-of-sale display in such a manner that they are appealing to consumers. Because most prior art bulkheads are made of a collection of separate panels, beams, and similar components, they generally appear to consumers as no more than an agglomeration of parts in need of assembly. The appearance and fit of the prior art bulkheads generally cannot be visualized by trailer owners until the bulkheads have actually been installed on the front wall of the trailer. In contrast, a bulkhead which uses fewer parts, or a bulkhead which could be presented to customers in substantially assembled form, would be more appealing to consumers.

Fifth, the prior art air return bulkheads are subject to bending and/or cracking or splintering due to the impact of shifting cargo, and due to temperature changes within the trailer. These events can produce sharp edges on the bulkheads which can catch and damage cargo, or injure people working within the trailer.

Sixth, the prior art air return bulkheads, which include air inlets only along their bottom edges, are highly susceptible to clogging. It is a common phenomenon for plastic cargo wrappings, e.g., shrink wrap, to tear during loading or transport and fall off of cargo. The plastic wrap is then blown along the trailer floor and sucked across or into the inlets, thereby crippling the refrigerator's air intake and preventing air circulation.

Finally, the prior art is also in need of an air return bulkhead which is resistant to damage and collapse from shifting cargo loads; which is lightweight to reduce fuel consumption; which is resistant to rust, mildew and rot, ultraviolet radiation, and/or swelling from water absorption; which can be manufactured of materials approved by the United States Department of Agriculture and the United States Food and Drug Administration for contact with foodstuffs; which does not catch on cargo and thereby cause damage to the cargo (or the bulkhead) when the cargo is being removed from the trailer; which has low friction so that cargo rubbing against it or lifted it it will not be damaged; which is inexpensively manufactured and attractive in appearance; and which is recyclable.

SUMMARY OF THE INVENTION

The present invention involves an air return bulkhead which solves the aforementioned disadvantages and which meets the aforementioned objectives. The invention is directed to an air return bulkhead for attachment to a wall having a refrigerator mounted thereon. The bulkhead includes a floating panel having a front face and an opposing rear face bounded by an edge. The edge includes an upper edge portion located at the top of the floating panel and having a size greater than the width of the refrigerator. An upper support panel extends across the entirety of the upper edge portion and descends from the upper edge portion to conclude at a terminal edge. The bulkhead also includes attachment means for mounting the bulkhead to the wall with the terminal edge of the upper support panel in abutment with the wall. After the bulkhead is mounted to the wall, a portion of the upper support panel may be cut away to define a space wherein the refrigerator may be fit.

Unlike the air return bulkheads of the prior art, the bulkhead includes an upper support panel descending from the upper edge portion and extending across the entirety of its length. This support panel may include cut guiding means thereon for guiding a cutting tool, e.g., a small valley wherein a cutting blade may fit, or a ridge against which a cutting blade may be guided. The cut guiding means define a predetermined path which bounds areas sized to accommodate standard prior art refrigerates. Installers can snugly fit the bulkhead on any trailer wall, about any refrigerator, by merely trimming the support panel along the cut guiding means. A space is thereby formed in the support panel wherein the refrigerator can fit so that the support panel and floating panel isolate the refrigerator inlet from the refrigerator outlet. In contrast, prior art bulkheads do not include such a continuous support panel, and instead merely include an aperture adjacent the upper edge portion wherein the refrigerator is fit. To isolate the refrigerator inlet from the refrigerator outlet, this aperture must be closed by supplementary panels or extension members. To fit these prior art bulkheads on different walls about different refrigerators, multiple differently-sized bulkheads need to be manufactured with differently-sized supplementary panels, and these parts require substantial assembly by the bulkhead installer. No prior art references, alone or in combination, teach or suggest the inclusion of the aforementioned support panel or the reduction in manufacturing costs and installation time that it provides.

The air return bulkhead of the present invention is preferably integrally formed of a thin material, most preferably plastic, and it may include other structural features as well. Some of these structural features are as follows.

First, the bulkhead may include a lower edge portion at the bottom of the floating panel, and a support column may rest below this lower edge portion. The support column may include opposing column ends with column walls extending therebetween. Cut guiding means may be included on the support column for guiding cutting tools, wherein the cut guiding means bound an area which may be removed to define an aperture on the support column. The installer can thereby easily add one or more apertures to the support column so that the support column walls define a passage which opens upon the front and rear of the bulkhead, and so that the airflow pattern provided by the bulkhead may be modified as desired. Additional cut guiding means can be added to the support columns to allow them to be cut to a desired length. Multiple support columns may be provided, and their respective heights may be different to obtain desired airflow properties. Web member connecting one column wall on one support column to one column wall on another support column may also be provided.

Second, the bulkhead may include a support flute depressed inwardly from the front face of the floating panel, wherein the support flute includes opposing flute ends with flute walls extending therebetween. The support flute may further include cut guiding means for guiding cutting tools, wherein the cut guiding means bound an area which may be removed to define an aperture on the support flute. By removing these areas, the installer can add one or more apertures to the support flute so that the support flute walls define a passage which opens upon the front and rear of the bulkhead, and so that the airflow pattern provided by the bulkhead may be modified as desired. Additional cut guiding means can be added to the support flute so that it can be cut to a desired length. The flute ends may be formed integrally or separately from the column ends, and the flute walls may be formed integrally or separately from the column walls. Multiple support flutes may be provided, and their respective heights may be different to obtain desired airflow properties.

Third, a side support panel may descend from either or each side edge portion of the floating panel between the upper and lower edge portions. A side webs can then extend from each side support panel to rest on the sides of the floating pane in a plane which is generally parallel to the floating panel. Each side web may include a web support column protruding therefrom, the web support column including opposing web column ends with web column walls extending therebetween. Cut guiding means for guiding cutting tools may be included on the web support column, wherein the cut guiding means bound an area which may be removed to define an aperture on the web support column. The installer can thereby add one or more apertures to the web support column so that the web column walls define a passage which opens upon the front and rear of the bulkhead, and so that the airflow pattern provided by the bulkhead may be modified as desired. Multiple web support columns may be provided, and their respective heights may be different to obtain desired airflow properties. Cut guiding means for guiding cutting tools may further be provided between the side webs and the remainder of the bulkhead so that the bulkhead installer may sever the side webs from the bulkhead if desired, or cut guiding means may be provided on the web support columns to allow them to be cut to a desired length.

Preferably, all surfaces resting between the floating panel and the terminal edge of the support panel, e.g., the support panel, the column walls, and the flute walls, are oriented at an angle of no less than approximately 5° (as measured from the perpendicular to the front face) so that multiple bulkheads may be stacked in interlocking fashion for efficient storage and display.

The invention is also directed to an air return bulkhead comprising a floating panel having a front face and an opposing rear face bounded by an edge. The edge includes a lower edge portion and a surrounding edge portion. At least one support panel extends from the surrounding edge portion and terminates in a terminal edge, which may be placed in abutment with a wall to maintain the floating panel in spaced relation to the wall. At least one support flute is depressed inwardly from the front face of the floating panel, and the support flute includes flute walls extending generally between the plane of the front face and a parallel plane which includes the terminal edge. Alternatively or additionally, at least one support column is included below the lower edge portion. The support column includes column walls extending generally between the plane of the front face and a parallel plane which includes the terminal edge. The bulkhead may include one or more of the structural features noted above, such as the side webs, side support columns, and cut guiding means located on various areas of the bulkhead.

The invention is also directed to a method of fitting an air return bulkhead on a wall around a refrigerator. First, an air return bulkhead is provided. The bulkhead includes a floating panel having a front face and a rear face bounded by an edge, wherein the edge includes an upper edge portion greater in size than the refrigerator. A support panel extends from the upper edge and terminates in a terminal edge. The support panel is formed of thin material capable of being cut by hand-held cutting means. Second, a portion of the support panel is cut away to form a space sized to accommodate the refrigerator. The terminal edge of the bulkhead is placed in abutment with the wall, with the refrigerator resting within the space. The bulkhead is attached to the wall by use of attachment means.

The method may further include any one or more of the following steps: providing support columns extending from the edge of the floating panel, and cutting apertures in the support columns to modify the bulkhead's airflow characteristics or cutting the support columns to a desired length; providing support flutes depressed within the floating panel, and cutting apertures in the support flutes to modify the bulkhead's airflow characteristics; and/or cutting away other portions of the bulkhead, e.g., the floating panel, to allow the bulkhead to fit about the refrigerator or other objects mounted on from the wall, or to modify the bulkhead's airflow characteristics.

To summarize, the air return bulkhead of the present invention deceases manufacturing costs because a single bulkhead is capable of fitting any size of trailer and refrigerator. Segments of the bulkhead may be cut away by the use of commonly available hand-held cutting tools to rapidly adapt the bulkhead to differently sized trailers and/or refrigerators. As a result, the bulkhead may be modified to fit the trailer and refrigerator in question and installed within fifteen minutes. The bulkhead allows air to flow against cargo resting adjacent the bulkhead, but at the same time it prevents short-cycling and blockage of the air flow between the floor and the refrigerator inlet. The bulkhead prevents shifting cargo from damaging the trailer front wall and/or refrigerator. It does not include any horizontal slats or rungs which can catch cargo being lifted from the trailer, and it has less sharp edges to puncture or otherwise damage cargo or injure personnel working within the trailer. The bulkhead is not as susceptible to bending, cracking, or splintering as the bulkheads of the prior art The support columns, support flutes, and floating panel of the bulkhead include angled surfaces to allow multiple bulkheads to be stacked in interfitting relation for easy storage and display, thereby allowing sellers to carry a greater number of them in stock with minimal storage space. Additionally, the bulkhead has low weight (approximately 47 lbs or 21 kg), and it may be easily lifted and held against the front wall of the trailer to visualize its appearance and performance. Since the bulkhead is preferably made of plastic, e.g., high molecular weight polyethylene, it is also recyclable; it is not subject to rusting or swelling from water absorption; it can be made resistant to mold, mildew, and ultraviolet radiation; it can be formed of materials which are approved by government agencies for contact with foodstuffs; and it has low friction when raising or lowering cargo against it.

Further features and advantages of the invention will be discussed in the Detailed Description of the Invention following the Brief Description of the Drawings.

DETAILED DESCRIPTION OF THE INVENTION

Figure 1:
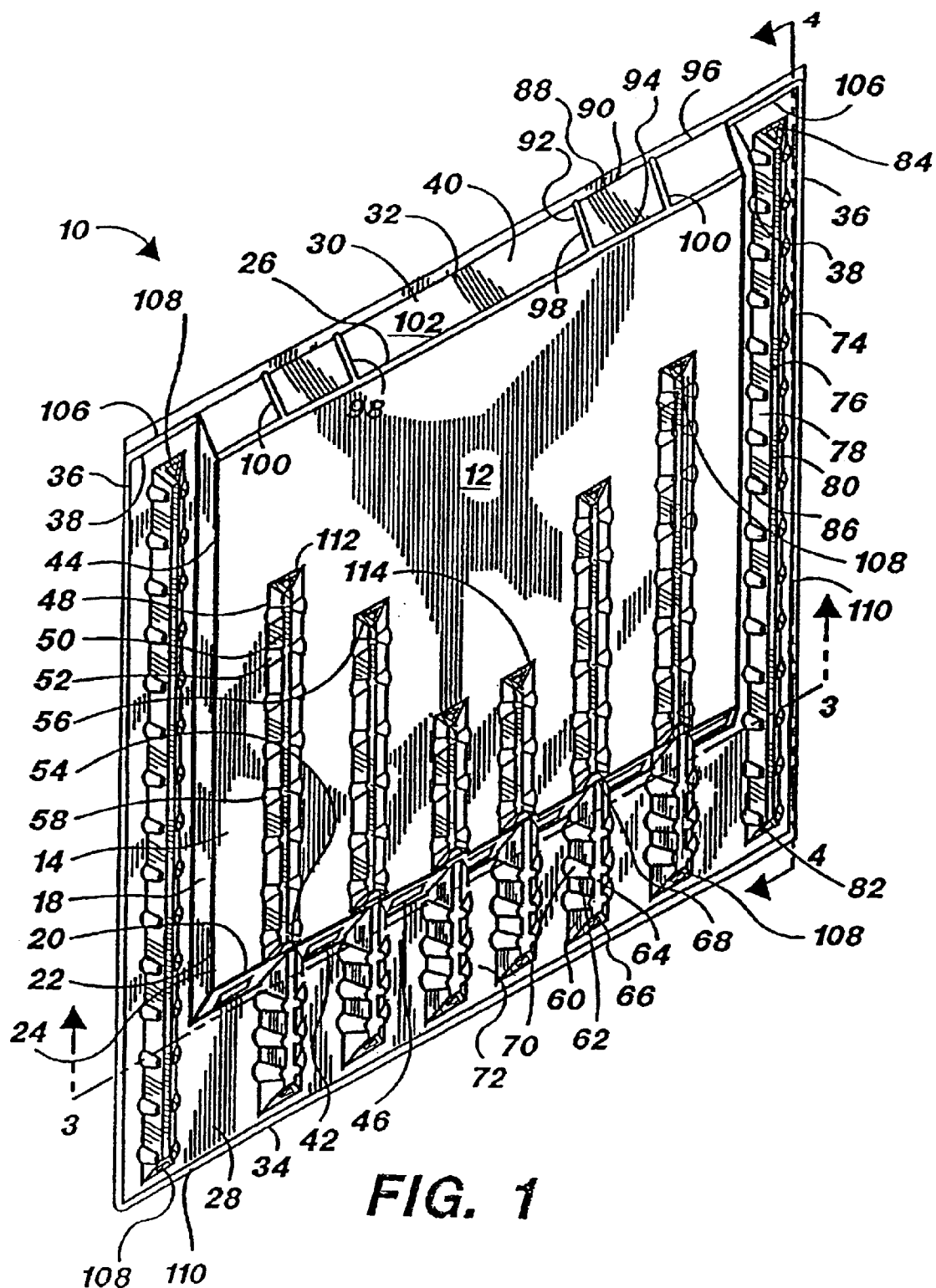
FIG. 1 is a front perspective view of the bulkhead of the present invention.
Figure 2:
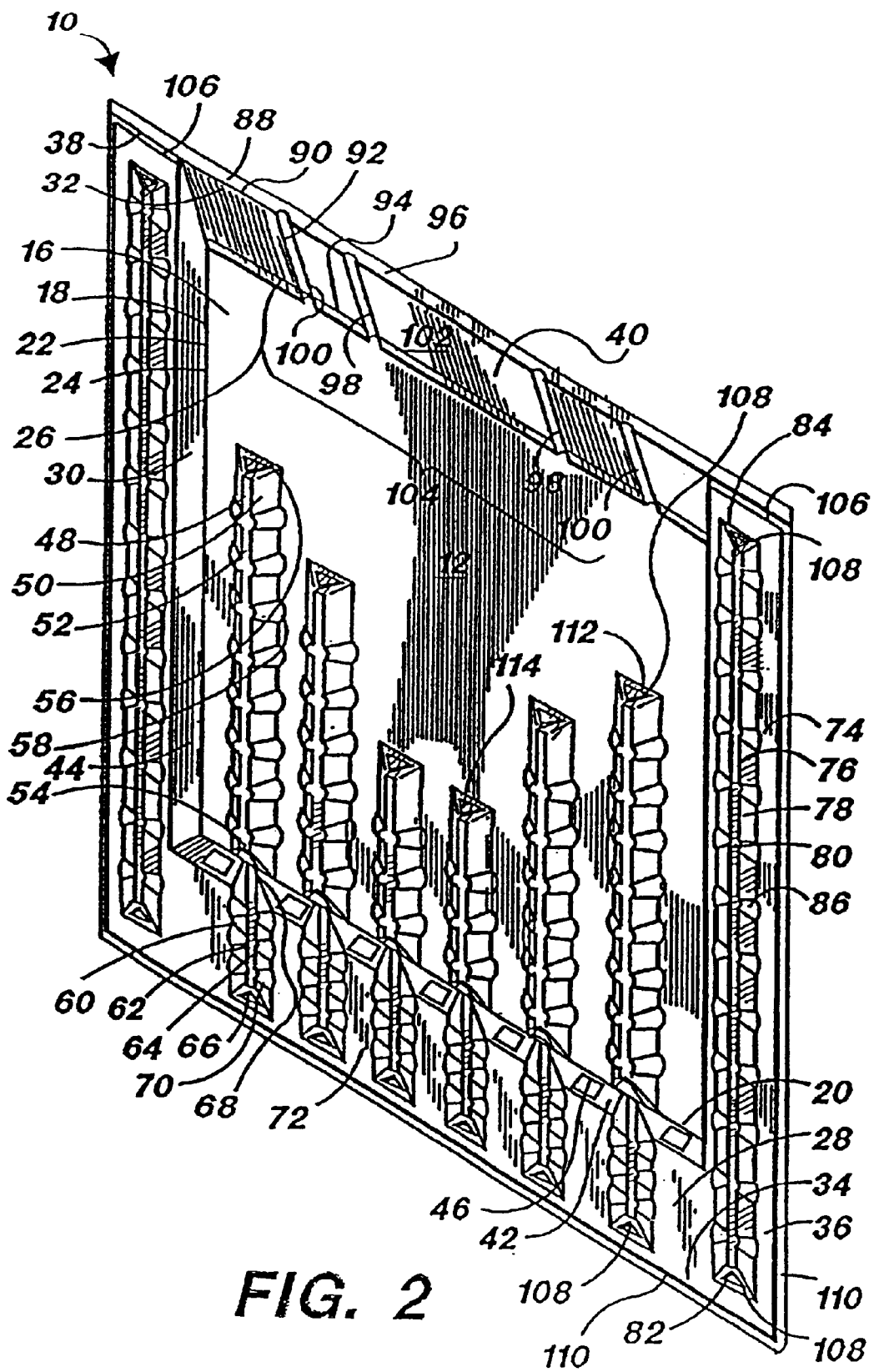
FIG. 2 is a rear perspective view of the bulkhead of FIG. 1.
Figure 3:
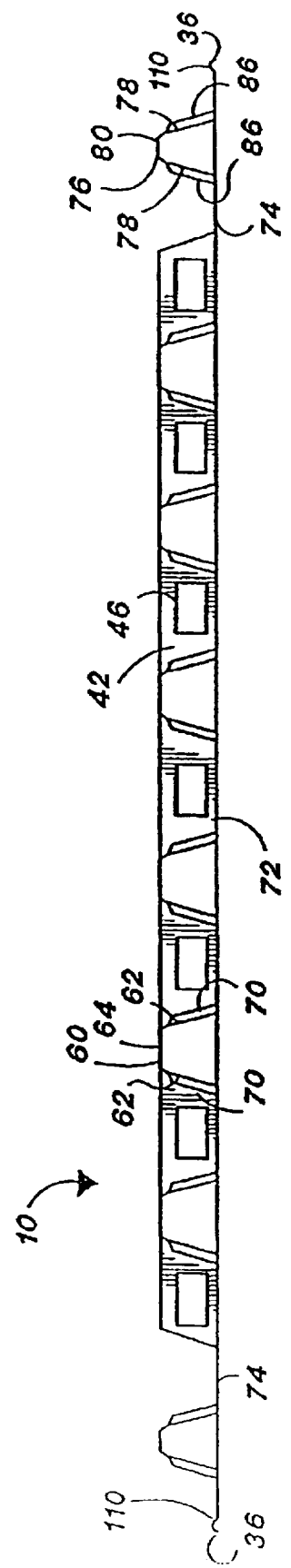
FIG. 3 is a sectional view of the bulkhead of FIG. 1 along the lines 3—3 of FIG. 1.
Figure 4:
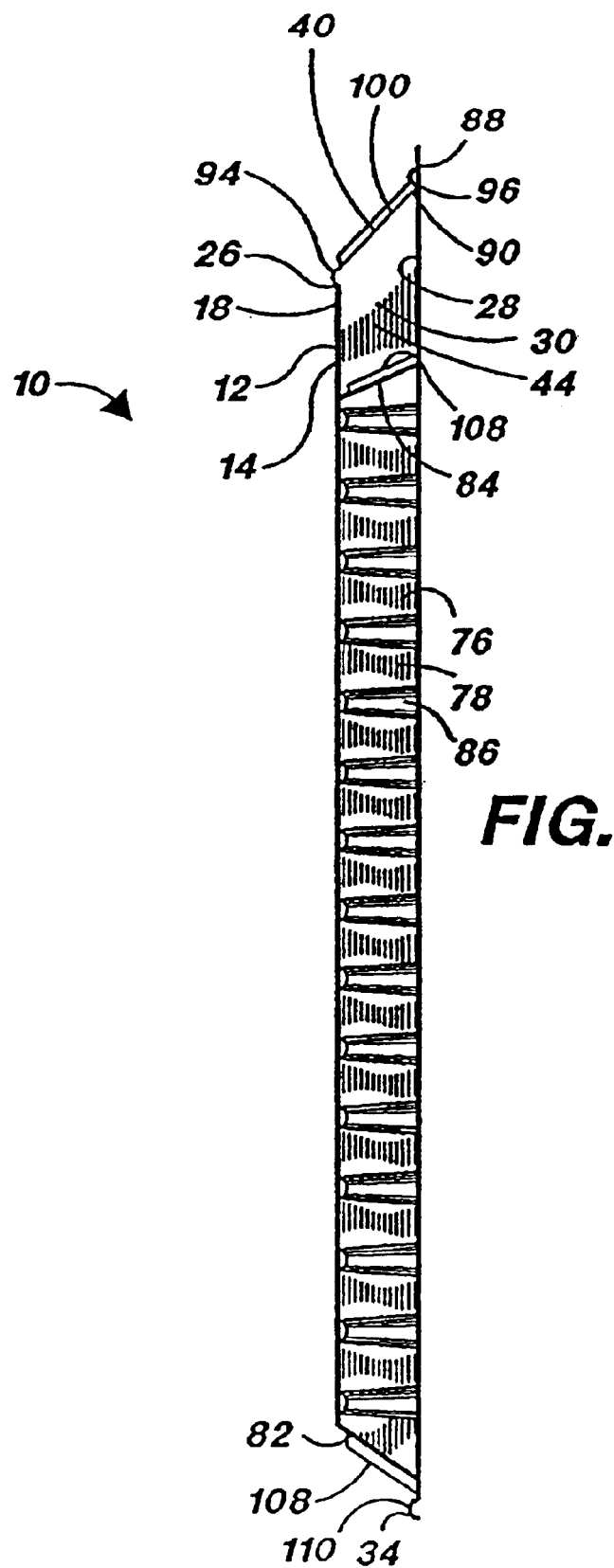
FIG. 4 is a sectional view of the bulkhead of FIG. 1 along the line 4—4.

Referring to the Figures of the drawings, in which the same or similar features are designated by the same reference numerals throughout, a first embodiment of the air return bulkhead is shown in FIGS. 1 and 2 at the reference numeral 10. The bulkhead 10 is preferably integrally formed of plastic, most preferably high molecular weight polyethylene, though it may be formed of composite materials, e.g., fiberglass, or metal, e.g., aluminum. The bulkhead materials may be chosen for resistance to mildew and ultraviolet radiation, and for safe contact with foodstuffs. When it is formed of plastic, the bulkhead 10 is preferably formed by thermoforming methods known to the art, e.g., by vacuum forming or plug and ring forming.

Figure 5:
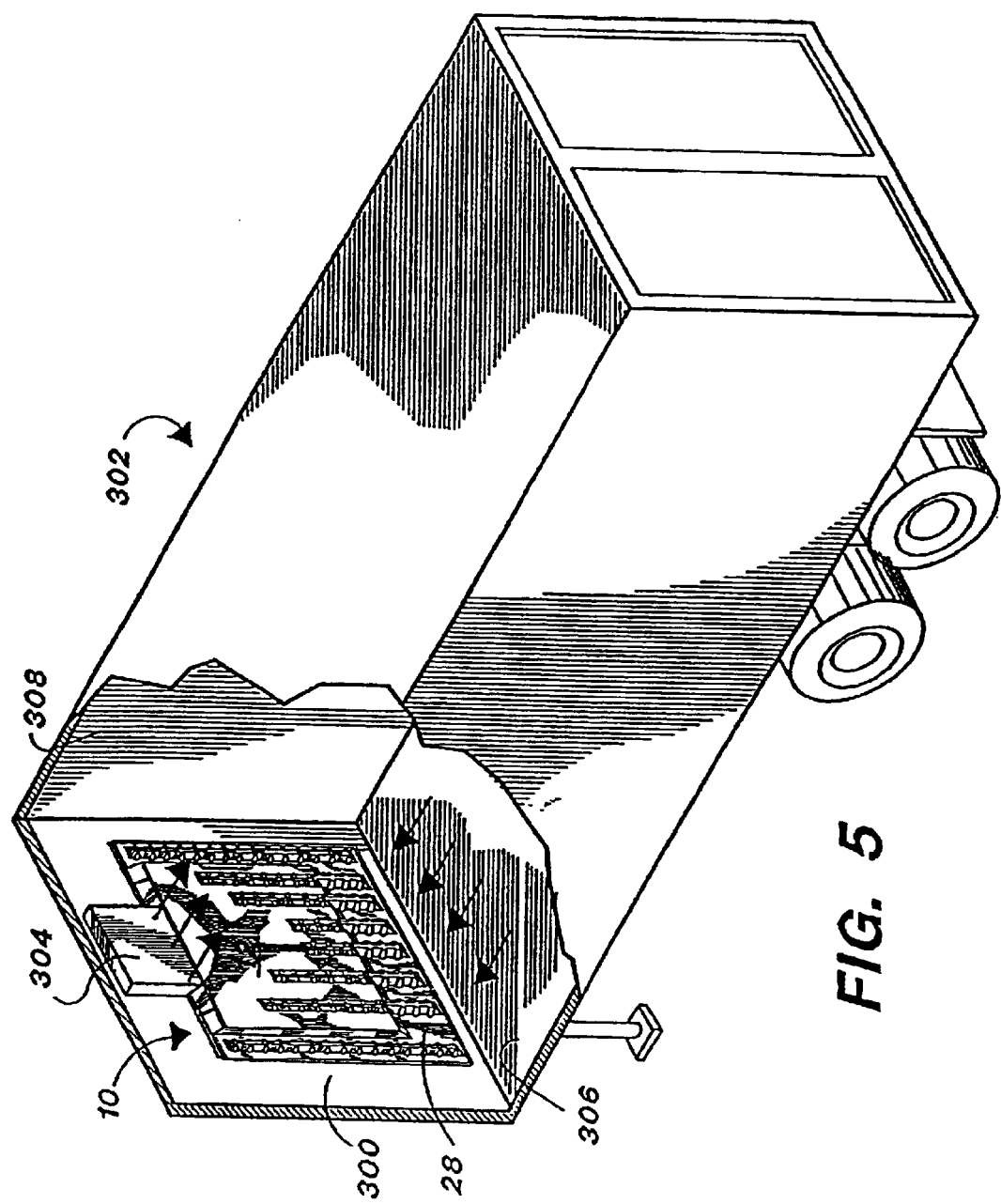
FIG. 5 is a perspective view of the bulkhead of FIG. 1 shown mounted on a front trailer wall.

The bulkhead 10 includes a generally planar floating panel 12 having a front face 14 and a rear face 16 which are bounded by a panel edge 18. The panel edge 18 may be considered to include a lower edge portion 20 and a surrounding edge portion 22, which in itself may be considered to include two side edge portions 24 and an upper edge portion 26. The bulkhead 10 further includes a generally planar wall panel 28 which is located within a plane generally parallel to and spaced from the floating panel 12. A series of support panels 30 connect the wall panel 28 and the floating panel 12, and these descend from the panel edge 18 of the floating pane 12 to conclude at a terminal edge 32 common to the wall panel 28. The wall panel 28 extends from the terminal edge 32 of the support panels 30 to terminate in a lower edge 34, two side edges 36, and two upper edges 38 on opposing sides of the floating panel 12. As illustrated in FIG. 5, this bulkhead 10 structure allows the wall panel 28 to be affixed to a front wall 300 of a trailer 302 so that the terminal edge 32 of the support panels 30 abuts the trailer front wall 300, and so that the floating panel 12 is spaced from the trailer front wall 300. The floating panel 12, support panels 30, and the trailer front wall 300 thereby fine a plenum chamber (not shown in the Figures) between the floating panel 12 and the trailer front wall 300.

The support panels 30 include an upper support panel 40 descending from the upper edge portion 26 of the panel edge 18, a lower support panel 42 descending from the lower edge portion 20 of the panel edge 18, and two side support panels 44, each descending from the side edge portions 24 of the panel edge 18. A series of apertures 46 may be located in the lower support panel 42, thereby allowing air to pass from the area in front of and below the floating panel 12 to the plenum chamber between the floating panel 12 and the trailer front wall 300. Alternatively, the lower support panel 42 may be eliminated entirely to provide apertures 46 between the floating panel 12 and wall panel 28 and adjacent the lower edge portion 20 of the panel edge 18.

As will be discussed shortly, cargo is intended to be stacked against the floating panel 12 after the wall panel 28 of the bulkhead 10 has been attached to a wall. To ensure that the floating panel 12 will remain spaced from the wall when cargo shifts against it, the floating panel 12 preferably includes one or more support flutes 48 depressed inwardly from its front face 14. Each support flute 48 includes opposing flute walls 50, a flute floor 52, a first flute end 54 adjacent the lower edge portion 20, and a second flute end 56 located within the floating panel 12. As illustrated best by FIG. 1, the first flute ends 54 may be integral with the lower support panel 42. The flute walls 50 and flute ends 54 and 56 extend between the plane of the floating panel 12 and the plane of the wall panel 28 so that the flute floor 52 rests generally within the same plane as the wall panel 28. The flute walls 50 thereby help to maintain the floating panel 12 in spaced relation from the wall. The support flutes 48 are spaced from each other so that they effectively form a series of slots in the front face 14 of the floating panel 12, as seen in FIG. 1, and are sized so that cargo of standard sizes cannot shift between them.

To further strengthen the floating panel 12, the flute walls 50 may include support ridges 58. Each support ridge 58 has a generally semicylindrical shape, and each is aligned with an axis oriented generally perpendicular to the floating panel 12 and wall panel 28, or with its axis at a generally acute angle to a perpendicular to the floating panel 12 and/or wall panel 28. The support ridges 58 enhance the rigidity of the flute walls 50 and better enable the floating panel 12 to resist damage from cargo shifting.

In order to prevent cargo from sliding beneath the lower support panel 42 and blocking the air flow through the apertures 46 into the plenum chamber, the bulkhead 10 may include one or more support columns 60 descending from the lower support panel 42 and the lower edge portion 20 of the floating panel 12, and protruding from the wall panel 28. Throughout this specification, the term "support column" is to be understood as describing columns located beneath the effective inlet to the plenum chamber, i.e., beneath the apertures 46, and thus this term does not encompass the structure of the floating panel 12 located between adjacent support flutes 48. The support columns 60 are preferably shaped similarly to the support flutes 48, and include opposing column walls 62, a column floor 64, a first column end 66 adjacent the lower edge 34 of the wall panel 28, and a second column end 68. As illustrated best by FIG. 1, the second column ends 68 may be integral with the lower support panel 42 and/or the first flute ends 54 of the support flutes 48. Where multiple support columns 60 are used, they are preferably spaced so that cargo of standard sizes cannot shift between adjacent columns 60 during cargo shifting. The column walls 62 may include support ridges 70 similar to the support ridges 58 to enhance the rigidity of the support columns 60. The wall panel 28 effectively forms a series of web members 72 which connect a column wall 62 of one support column 60 to a column wall 62 on an adjacent support column 60.

The wall panel 28 of the bulkhead 10 can further be considered to include side webs 74 which each extend generally from the terminal edges 32 of the side support panels 44 to the side edges 36 of the wall panel 28. These side webs 74 may each include one or more web support columns 76, each of which is preferably similar in form to the support columns 60. The web support columns 76 may each include two opposing web column walls 78, a web column floor 80, and opposing web column first ends 82 and web column second ends 84. As with the support columns 60, the web column walls 78 may extend between the plane of the floating panel 12 and the plane of the wall panel 28 so that the web column floor 80 is located generally within the same plane as the floating panel 12. The web support columns 76 may also include support ridges 86.

A flange 88 may be provided at the top of the bulkhead 10 so that it protrudes from an upper edge 90 of the upper support panel 40 (i.e., the terminal edge 32 of the upper support pane 40) and the upper edges 38 of the wall panel 28, and so that it rests within generally the same plane as the wall panel 28. The flange 88 may be riveted or otherwise attached to the trailer front wall 300 at various portions along its length to insure that the upper edge 90 of the upper support panel 40 is in tight abutment with the trailer front wall 300, thereby decreasing the possibility of air leakage from in front of the bulkhead 10 to the plenum chamber behind the bulkhead 10.

As previously noted, one of the primary deficiencies of the prior art bulkheads is that they are not easily adapted to fit different trailer walls and refrigeration units. In order to fit differently-sized walls and refrigerators, the prior art bulkheads utilize differently-sized floating panels in accompaniment with differently-sized supplementary panels or extension members which fit on top of the floating panel to surround the refrigerator. The bulkhead 10 avoids the need for manufacturing and assembling differently-sized floating panels and supplementary panels by providing a cut guiding means on the upper support panel 40 for guiding cutting tools along a predefined path which bounds discrete areas wherein different prior art refrigerators may be fit. Thus, by guiding a cutting tool along different cut guiding means on the upper support panel 40, the installer may cut differently-sized apertures in the upper support panel 40 which accommodate differently-sized refrigerators.

As illustrated in FIG. 1, the cut guiding means is preferably in the form of a series of cutting ridges 92 on the upper support panel 40. These cutting ridges 92 comprise a raised lip on the front of the bulkhead 10 (i.e., a depressed valley on the rear of the bulkhead 10) having a height of approximately ⅛ inch (0.3 cm). Because these cutting ridges 92 provide a discontinuity in the otherwise smooth and planar surface of the upper support panel 40, they present a clearly defined path along which a cutting tool may be guided. The cutting ridges 92 include a lower cutting ridge 94 at the upper edge portion 26 (i.e., near the boundary of the upper support panel 40 and the floating panel 12), and an upper cutting ridge 96 at the upper edge 90 of the upper support panel 40. Vertically oriented cutting ridges are then provided at equally-spaced distances from the central vertical axis of the bulkhead 10: two first vertical cutting ridges 98, which are preferably spaced 37 inches (94 cm) apart (i.e., each at 18.5 inches/47 cm from the central vertical axis of the bulkhead 10); and two second vertical cutting ridges 100, which are preferably spaced 66 inches (168 cm) apart (i.e., each at 33 inches/84 cm from the central vertical axis of the bulkhead 10). The area on the upper support panel 40 bounded by the first vertical cutting ridges 98 and the lower and upper cutting ridges 94 and 96 therebetween defines a first cutaway segment 102 which may be easily and rapidly cut out by use of hand cutting tools to fit standard 37 inch refrigerator units. Similarly, the area on the upper support panel 40 bounded by the second vertical cutting ridges 100 and the lower and upper cutting ridges 94 and 96 therebetween defines a second cutaway segment 104 which can be cut away with hand-held cutting tools to allow the bulkhead 10 to fit around standard 66 inch refrigerator units. As seen in FIG. 5, after the proper cutaway segment is removed, the bulkhead 10 may be fit on the trailer front wall 300 beneath the refrigerator 304. The lower edge of the refrigerator 304 fits into the aperture in the bulkhead 10 formed by the removal of the cutaway segment so that the upper support panel 40 surrounds a lower portion of the sides of the refrigerator 304. By fitting the bulkhead 10 on the trailer front wall 300 in this manner, the refrigerator inlet rests within the plenum chamber, and the inlet is thereby effectively "moved" to the apertures 46 in the lower support panel 42.

It is understood that the cut guiding means may be formed by raised lips, depressed valleys, or any other forms of discontinuities in the surface of the bulkhead 10 which would allow one to guide a cutting tool along the surface of the bulkhead 10. It is further understood that the cut guiding means is not strictly necessary for the use and practice of the bulkhead 10. The bulkhead 10 could be provided without the cut guiding means, and the installer could simply cut the bulkhead 10 at the appropriate places in order to allow it to be installed on the trailer front wall 300 around the refrigerator 304. However, it has been found that the cut guiding means is beneficial in that it eliminates the need for measuring standard refrigerator dimensions and properly placing and marking them on the bulkhead 10, and it also provides a sure guide for a cutting tool and reduces the chances of an inaccurate cut. An accurate cut enhances the fit of the bulkhead 10 around the refrigerator 304 and reduces the possibility of air leakage from the front of the bulkhead 10 to the plenum chamber behind the bulkhead 10.

It is also understood that the cut guiding means could be added to other portions of the bulkhead 10 if desired. For example, the cutting ridges 92 could extend into the floating panel 12 so that portions of the floating panel 12 may easily be removed to allow the floating panel 12 to surround the lower edge of the refrigerator 304 and a lower portion of its sides, and so that the bulkhead 10 can be mounted higher on the trailer front wall 300. Additionally, cutting ridges could be added to separate the side webs 74 from the remainder of the wall panel 28 so that an installer could entirely remove the side webs 74 and the web support columns 76 if desired. Cutting ridges 106 may also be provided at the upper edges 38 of the wall panel 28 to allow the flange 88 to be removed if the installer so desires. A cutting ridge could be provided along the upper edge 90 of the upper support panel 40 between the upper support panel 40 and the flange 88, but this is not necessary because the angled interface between the flange 88 and the upper support panel 40 provides a discontinuity in the contour of the bulkhead 92 along which a cutting tool may be guided. Cutting ridges could also be added at various points along the lengths of the support flutes 48 and support columns 60 so that portions of their lengths may be removed to adjust their sizes.

The bulkhead 10 is also adapted to allow an installer to tailor the air flow provided by the bulkhead 10 as desired. As best shown by FIG. 1, this is done by providing terminal raised portions 108 at any or all of the first and second flute ends 54 and 56 of the support flutes 48, the first column ends 68 of the support columns 60, and the first and second ends 82 and 84 of the web support columns 76. The boundaries of the raised portions 108 form a cut guiding means for guiding for a cutting tool so that the raised portions 108 may be easily removed where desired. An installer could, for example, cut away the raised portions 108 at the first flute ends 54 and second flute ends 56 of the support flutes 48, and at the first column ends 66 of the support columns 60, so that air will flow from the trailer floor 306 through the support columns 60 and support flutes 48. When cargo is stacked against the floating panel 12, the air flowing through the support flutes 48 will directly contact the cargo and thereby cool it to a greater extent. The air will then enter the apertures formed by the removal of the raised portions 108 at the second flute ends 56 so that the air may enter the plenum chamber and return to the refrigerator inlet. Similarly, the raised portions 108 at the web column first and second ends 82 and 84 may be removed from the web support columns 76 to allow a greater effective air flow passage at the sides of the floating panel 12. Any or all of the raised portions 108 at the first and second flute ends 54 and 56 of the support flutes 48, the first column ends 66 of the support columns 60, and the web column first and second ends 82 and 84 of the web support columns 76 may be removed to allow the installer to tailor the airflow as desired.

The removal of the raised portions 108 at any of the aforementioned locations has the additional advantage that such removal forms additional air inlets for the refrigerator which are located away from the apertures 46. This makes it less likely that plastic wrap or other debris can simultaneously clog all of the air inlets.

As FIG. 1 illustrates, a lip 110 may be provided about the perimeter of the wall panel 28 at its lower and side edges 34 and 36. The lip provides a discontinuity in the contour of the wall panel 28 against which rivets or other fasteners can be placed during installation of the bulkhead 10. This prevents sliding or displacement of the fasteners during attachment of the bulkhead 10 to the trailer front wall 300, and thereby enhances the speed of installation.

Preferably, all surfaces of the bulkhead 10 located between the floating panel 12 and the wall panel 28, e.g., the support panels 30, the flute walls 50 and ends 54 and 56, and the column walls 62 and ends 66 and 68, are at an angle so that multiple bulkheads 10 can be easily stacked atop each other in interfitting relation for easy storage. Once stacked, the floating panels 12, support panels 30, support flutes 48, support columns 60, etc. are adjacently situated in parallel relation. An angle of 10° has been found to work well in allowing multiple bulkheads to be stacked and unstacked, and preferably the surfaces are oriented at no less than 5°. However, the upper support panel 40 is preferably aligned at a 45° angle for easier cutting of the cutting ridges 92 when the wall panel 28 of the bulkhead 10 is placed on the ground during installation.

Where multiple support flutes 48 are used, the support flutes 48 may include two outer support flutes 112 and one or more central or innermost support flutes 114 resting therebetween. As illustrated in FIGS. 1 and 2, the support flutes 48 may be staggered in height so that the support flutes 48 located more centrally within the floating panel 12 are shorter, i.e., so that the support flutes 48 grow shorter from the outer support flutes 112 to the central support flutes 114. This ensures that the suction pressure exerted by the refrigerator inlet on the second flute end 56 of each support flute 48 will be approximately equal, thereby creating approximately equal airflow within each support flute 48 and preventing decreased cooling near the center or sides of the trailer 302.

Certain dimensions are preferred for the bulkhead 10. The width of the bulkhead, i.e., the width of the lower edge 34, is preferably approximately 86 inches (218 cm) long. The overall height of the bulkhead 10, i.e., the height of the side edges 36, is preferably approximately 70 inches (178 cm). The width of the floating panel 12, i.e., the width of the upper and lower edge portions 20 and 26, is preferably approximately 70 inches (178 cm), providing a width of approximately 8 inches (20 cm) for each of the web members 72. The web support columns 76 are preferably approximately 60.5 inches (154 cm) long. The support columns 60 are preferably approximately 16 inches (41 cm) long and the support flutes 48 preferably vary in height from a maximum of 28.5 inches (72 cm) for the outer support flutes 112 to a minimum of 20.5 inches (52 cm) for the innermost support flutes 114. The bulkhead 10 preferably has an overall thickness of approximately 4.5 inches (11 cm), i.e., the floating panel 12, column floor 64, and web column floor 80 are spaced approximately 4.5 inches from the plane of the wall panel 28 so that the refrigerator intake of standard refrigerators will fit behind the plane of the floating panel 12. The overall thickness of the bulkhead material is preferably approximately 0.225 inches (0.6 cm). The top flange 88 is preferably 1 inch (2.5 cm) wide.

The installation and operation of the bulkhead 10 can be described as follows. The installer may tic the bulkhead 10 and remove the first cutaway segment 102 or second cutaway segment 104 (or a differently sized segment) so that the remaining portion of the upper support panel 40 will properly fit around the refrigerator 304 as shown in FIG. 5. As noted above, the removal of these segments can be done by use of a hand-held cutting tool, e.g., a battery-powered portable drill having a rotary cutting wheel attachment, at the cutting ridges 92. Because the bulkhead 10 only weighs approximately 47 pounds (21 kg), it is easily maneuvered and manipulated by a single person for cutting and mounting on the trailer front wall 300. The user may additionally sever the side webs 72 from the bulkhead 10 if desired, or may cut into the floating panel 12 to extend the first or second cutaway segments 102 and 104 so that a portion of the floating panel 12 will surround the refrigerator 304 and so that the bulkhead 10 will fit higher up on the trailer front wall 300. Portions of the flange 88 may be cut away as desired. The flange 88, and the wall panel 28 at its web members 72 and/or side webs 74, may then be riveted to the trailer front wall 300 or attached by other attachment means known to the art, e.g., by use of fasteners or brackets, adhesives, or welding. The refrigerator inlet is thereby enclosed behind the bulkhead 10 within the plenum chamber, and an effective refrigerator inlet is formed at the apertures 46. The bulkhead 10 can be cut and attached to a trailer front wall 300 in approximately 15 minutes, approximately one quarter of the time required for most prior art bulkheads. It can be appreciated that the manufacturer of the bulkhead 10 does not need to manufacture differently-sized floating panels, supplementary panels, or extension members to properly fit the bulkhead 10 around the refrigerator 304, and the installer of the bulkhead 10 does not need to assemble multiple parts in order to form a working bulkhead. Because the bulkhead 10 is a "universal mount" bulkhead, both the manufacture and installer can save money by reducing manufacturing, assembly, and installation time.

The installer may cut away other portions of the bulkhead 10 either before or after installation to obtain the desired air flow characteristics for the bulkhead. For example, the raised portions 108 at the first and second flute ends 54 and 56 of the support flutes 48 and the fist column ends 66 of the support columns 60 may be cut away to provide an effective refrigerator inlet at the first column ends 66. Air circulation is increased because it may flow through the first column ends 66 as well as the apertures 46. Additionally, air flowing through the support flutes 48 will flow directly against cargo rests against the floating panel 12. The raised portions 108 at the first and second ends 82 and 84 of the web support columns 76 may also be removed to further increase air circulation. It is understood that an installer could remove any or all of the raised portions 108 on the ends of the support flutes 48, support columns 60, and web support columns 76 to obtain any desired air flow pattern.

It is important to note that numerous features described above for the bulkhead 10 are not required to use the bulkhead 10 and obtain its benefits. For example, the side support panels 44 and side webs 74 may be omitted entirely if the floating panel 12 and upper support panel 40 are to span the entire width of the trailer front wall 300 between the trailer side walls 308. The installer need only cut the upper support panel 40 to accommodate the refrigerator 304, and then install the bulkhead 10 on the trailer front wall 300 so that the upper support panel 40 and floating panel 12 isolate the refrigerator inlet from the refrigerator outlet and form an effective refrigerator inlet nearer the trailer floor 306. Support flutes 48 and support columns 60 may then be used to strengthen the bulkhead 10, and the flute ends 54 and 56 and first column ends 66 may be cut to allow the airflow about the bulkhead 10 to be modified as desired.

Other modifications and additions to the bulkhead 10 are contemplated and considered to be within the spirit of the invention. A list of exemplary modifications and additions follows. This list is not intended to be exhaustive, but is rather intended to merely illustrate some of the possible alternative embodiments of the bulkhead 10 contemplated by the inventor.

First, the bulkhead 10 may be used in combination with plugs formed of plastic or other material which are sized to removably fit within the apertures formed by the removal of the raised portions 108 at the first and second flute ends 54 and 56 of the support flutes 48, the first column ends 66 of the support columns 60, and the first and second ends 82 and 84 of the web support columns 76. Such plugs allow the installer to remove all of the raised portions 108 to form apertures, and then permanently or temporarily plug some or all of the apertures to change the air flow within the trailer 302 as the installer desires. Therefore, if a cargo owner specifies that a certain air flow pattern is required, the installer can use the plugs to retroactively modify the air flow pattern. As an example, where the raised portions 108 at the second flute ends 56 of the support flutes 48 and the first column ends 66 of the support columns 60 are cut away, an effective refrigerator inlet is formed at the first column ends 66 when cargo rests against the floating panel 12. However, when no cargo rests against the floating panel 12 to channel air from the first flute end 54 to the second flute end 56, the effective refrigerator inlet is moved to the send flute end 56. If the installer does not want this to occur, a plug can be installed into the second flute end 56 when the cargo content of the trailer 302 decreases to the point where the second flute end 56 is exposed.

Second, the support flutes 48, the support columns 60, and the web support columns 76 may have a curved form rather than the linear form illustrated in the Figures.

Third, support ridges such as the support ridges 58, support ridges 70, and support ridges 86 may be included on the upper support panel 40, lower support panel 42, and side support panels 44 as well as on other portions of the bulkhead 10.

Fourth, the raised portions 108 at the first and second flute ends 54 and 56 of the support flutes 48, the first column ends 66 of the support columns 60, and the first and second ends 82 and 84 of the web support columns 76 need not literally be raised, and can take the form of areas bounded by cut guiding means such as the cutting ridges 92 noted above. Similarly, the apertures 46 need not be provided in the bulkhead 10 and can instead be defined by cut guiding means on the lower support panel 42 so that the installer can form the apertures 46.

Figure 6:
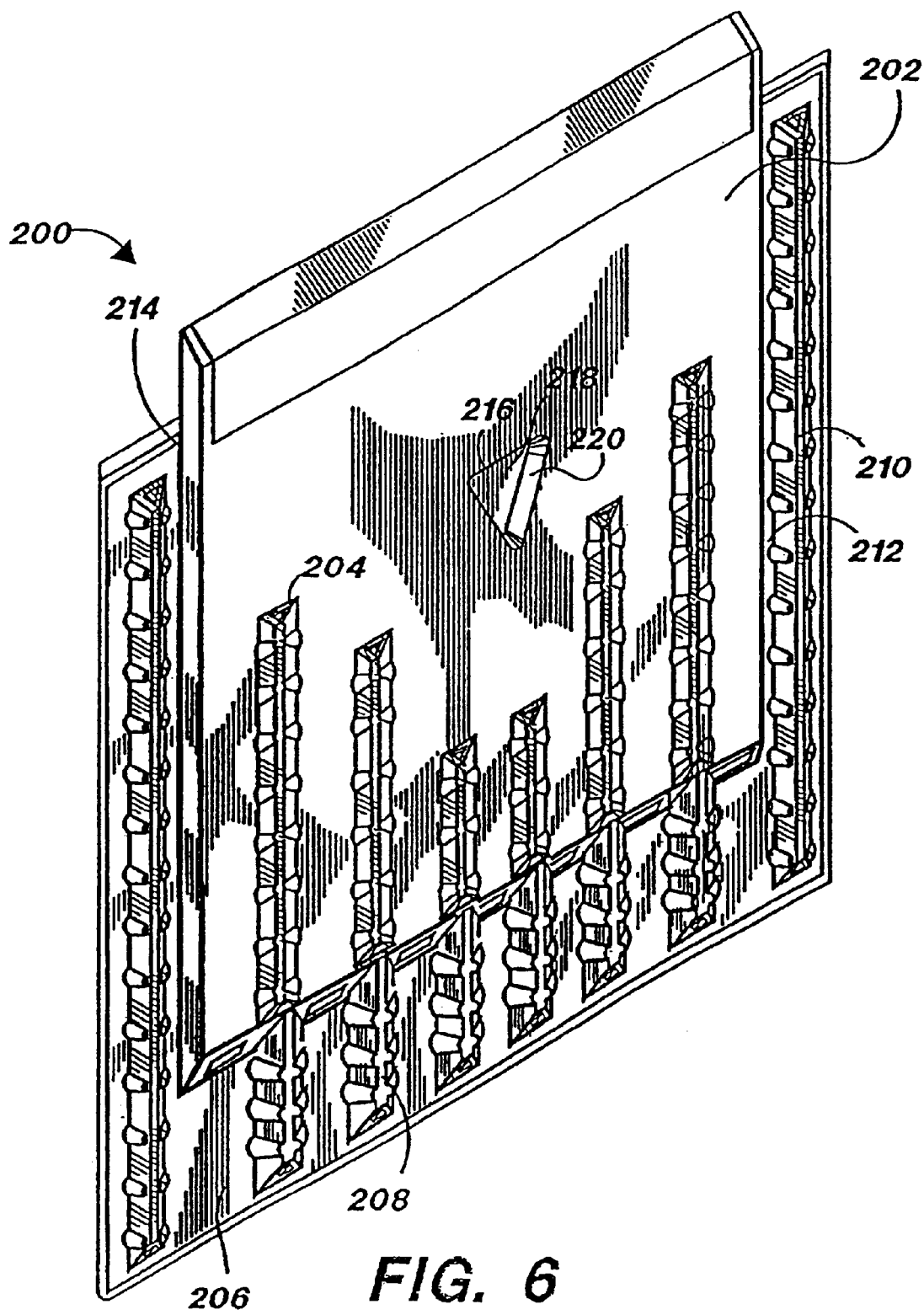
FIG. 6 is a front perspective view of an alternate embodiment of the bulkhead of the present invention.

FIG. 6 illustrates another embodiment of the bulkhead of the present invention at the reference number 200. As with the bulkhead 10, the bulkhead 200 has a floating panel 202 with support flutes 204 integrally formed therein, and a wall panel 206 with support columns 208 and web support columns 210 formed therein and integrally joined to the floating panel 202. The web support columns 210 are included on side web portions 212 of the wall panel 206, and cutting ridges 214 are included to allow the installer to separate the side web portions from the remainder of the wall panel 206 by use of a cutting tool if desired. The floating panel 202 extends further upward than the side web portions 212, and it does not include cutting ridges thereon, requiring an installer to measure and mark cut lines by hand. To further enhance the resistance of the floating panel 202 to stresses imposed by cargo shifting, the floating panel 202 includes a support post 216 formed therein. The term "support post" is used to define any area depressed into the plane of the wall panel 206 and located away from the edges of the floating panel 202. The support post 216 includes a support post floor 218 which rests generally within the plane of the wall panel 206, and support post walls 220 extending between the floating panel 202 and the support post floor 218. The bulkhead 200 may be installed and operated in generally the same fashion as the bulkhead 10, but the support post floor 218 provides an additional area which may be attached to the trailer front wall 300. It is understood that multiple support posts 216 could be included within the floating panel 202, just as any number of support flutes 204, support columns 208, and web support columns 210 may be used.

It is understood that the various embodiments of the bulkheads discussed above can also be mounted on walls and placed in use without cutting them beforehand. As an example, it may be possible to provide a refrigerator for a trailer which is flush with the front wall of the trailer. In that case, the bulkheads described above may be mounted on the front wall of the trailer so that the upper support panel rests between the refrigerator inlet and outlet to isolate them from each other. No cutting is necessary to fit the bulkhead around the refrigerator.

It is understood that the invention is not confined to the particular construction of parts and uses described and illustrated above, and rather the invention embraces such modified embodiments that come within the scope of the following claims. Further, it is understood that in these claims, means plus function clauses are intended to cover the structures described herein as performing their recited function, and also both structural equivalents and equivalent structures. As an example, though a nail and a screw may not be structural equivalents insofar as a nail employs a cylindrical surface to secure parts together whereas a screw employs a helical surface, in the context of fastening parts, a nail and a screw are equivalent structures.

What is claimed is:

1. An air return bulkhead for attachment to a wall having a refrigerator mounted thereon, the refrigerator having a generally horizontally oriented lateral width, the air return bulkhead comprising:
   a. a floating panel including opposing front and rear face, the faces having an upper edge, an opposing lower edge, and opposing side edges between which the width of the floating panel is defined,
   b. an upper support panel integrally connected to the floating panel at its upper edge,
      wherein the upper support panel extends continuously across the width of the floating panel and descends rearwardly from the rear face of the floating panel,
   c. two side support panels, each side support panel being connected to a respective one of the side edges of the floating panel and descending rearwardly from the rear face of the floating panel,
      wherein the upper support panel and side support panels may be situated adjacent the trailer wall with the floating panel spaced from the trailer wall, thereby defining a plenum chamber between the floating panel, the trailer wall, the upper support panel, and the side support panels,
      and wherein one or more openings are defined in the air return bulkhead beneath the lower edge of the floating panel, the openings allowing passage of air to the plenum chamber,
      whereby at least a portion of the upper support panel may be cut away to define a space wherein the lateral width of the refrigerator may be fit when the bulkhead is situated against the trailer wall, the refrigerator thereby resting at least partially within the plenum chamber.

2. The air return bulkhead of claim 1 wherein the upper support panel has a width of at least 66 inches.

3. The air return bulkhead of claim 1 wherein the upper support panel includes laterally spaced ridges rising therefrom.

4. The air return bulkhead of claim 1 wherein the upper support panel includes laterally spaced valleys depressed therein.

5. The air return bulkhead of claim 1 wherein the front face of the floating panel includes a laterally-extending ridge rising therefrom.

6. The air return bulkhead of claim 1 further comprising two or more support columns resting below the lower edge of the floating panel,
   wherein each support column includes a column floor extending downwardly from the lower edge of the floating panel, and opposing column walls descending rearwardly from the column floor.

7. The air return bulkhead of claim 6 wherein the one or more openings includes an aperture defined within one of the support columns.

8. The air return bulkhead of claim 6 further comprising one or more lower support panels, each of the lower support panels descending rearwardly from the lower edge of the floating panel between two of the support columns.

9. The air return bulkhead of claim 8 wherein the one or more openings includes an aperture defined within one of the lower support panels.

10. The air return bulkhead of claim 1 further comprising one or more depressions recessed into the front face of the floating panel between the upper and lower edges of the floating panel.

11. The air return bulkhead of claim 10 wherein at least one of the depressions is spaced from the upper, lower, and side edges of the floating panel.

12. The air return bulkhead of claim 10 further comprising two or more support columns resting below the lower edge of the floating panel,
wherein each support column includes opposing column walls descending rearwardly with respect to the rear face of the floating panel, and a column floor situated between the column walls and extending downwardly with respect to the lower edge of the floating panel.

13. The air return bulkhead of claim 12 wherein at least one of the depressions is recessed into the front face of the floating panel directly above one of the support columns.

14. The air return bulkhead of claim 12 wherein at least one of the depressions defines a support flute which includes elongated opposing flute walls extending between opposing flute ends.

15. The air return bulkhead of claim 14 wherein at least one of the flute ends is recessed into the front face of the floating panel directly above one of the support columns.

16. An air return bulkhead comprising:
a. a floating panel including opposing front and rear faces, an upper edge, an opposing lower edge, and opposing side edges,
b. an upper support panel descending rearwardly from the rear face of the floating panel at its upper edge,
c. two side support panels, each side support panel descending rearwardly from the rear face of the floating panel at one of its side edges,
d. one or more depressions recessed into the front face of the floating panel between the upper and lower edges of the floating panel,
e. two or more support columns, wherein each of the support columns includes opposing column walls extending downwardly with rest to the lower edge of the floating panel and descending rearwardly with respect to the rear face of the floating panel.

17. The air return bulkhead of claim 16 wherein the upper support panel is integrally formed with the floating panel and extends continuously across the width of the floating panel.

18. The air return bulkhead of claim 16 wherein the upper support panel includes spaced ridges defined thereon.

19. The air return bulkhead of claim 16 wherein the upper support panel includes spaced valleys defined therein.

20. The air return bulkhead of claim 16 wherein at least one of the depressions is spaced from the upper, lower, and side edges of the floating panel.

21. The air return bulkhead of claim 16 wherein one or more support columns has an aperture defined therein, wherein each support column having the defined aperture includes a passage defined between its column walls, with the aperture opening onto the passage.

22. The air return bulkhead of claim 16 further comprising one or more lower support panels descending rearwardly from the lower edge of the floating panel between two of the support columns.

23. The air return bulkhead of claim 22 wherein at least one of the lower support panels has an aperture defined therein.

24. The air return bulkhead of claim 16 wherein at least one of the depressions is recessed into the front face of the floating panel directly above one of the support columns.

25. The air return bulkhead of claim 24 wherein at least one of the depressions defines a support flute, each support flute including elongated opposing flute walls extending between opposing flute ends.

26. The air return bulkhead of claim 25 wherein at least one of the flute ends is recessed into the front face of the floating panel directly above one of the support columns.

27. An air return bulkhead for attachment to a wall having a refrigerator mounted thereon, the refrigerator having a generally horizontally oriented lateral width, the air return bulkhead comprising:
a. a floating panel including opposing front and rear faces, an upper edge, an opposing lower edge, and opposing side edges between which the width of the floating panel is defined,
b. an upper support panel descending rearwardly from the upper edge of the floating panel,
c. two side support panels, each side support panel descending rearwardly from a respective one of the side edges of the floating panel,
d. one or more depressions recessed into the front face of the floating panel between the upper and lower edges of the floating panel,
wherein the upper support panel and side support panels may be situated adjacent the trailer wall with the floating panel spaced from the trailer wall, thereby defining a plenum chamber between the floating panel, the trailer wall, the upper support panel, and the side support panels,
and wherein one or more openings onto the pleunum chamber are defined in the air return bulkhead beneath its lower edge,
whereby at least a portion of the upper support panel nay be cut away to define a space wherein the lateral width of the refrigerator may be fit when the bulkhead is situated against the trailer wall, the refrigerator thereby resting at least partially within the plenum chamber.

28. The air return bulkhead of claim 27 wherein the upper support panel is integrally formed with the upper support panel and extends continuously across the width of the floating panel.

29. The air return bulkhead of claim 27 wherein the upper support panel includes spaced ridges defined thereon.

30. The air return bulkhead of claim 27 wherein the upper support panel includes spaced valleys defined thereon.

31. The air return bulkhead of claim 27 wherein at least one of the depressions is spaced from the upper, lower, and side edges of the floating panel.

32. The air return bulkhead of claim 27 further comprising two or more support columns resting below the lower edge of the floating panel,
wherein each support column includes a column floor extending downwardly from the lower edge of the floating panel, and opposing column walls descending rearwardly from the column floor.

33. The air return bulkhead of claim 32 wherein the one or more openings includes an aperture defined in one of the support columns.

34. The air return bulkhead of claim 32 further comprising a lower support panel descending rearwardly from the lower edge of the floating panel between two of the support columns.

35. The air return bulkhead of claim 34 wherein the one or more openings includes an aperture defined within one of the lower support panels.

36. The air turn bulkhead of claim 32 wherein at least one of the depressions is recessed into the front face of the floating panel directly above one of the support columns.

37. The air return bulkhead of claim 32 wherein at least one of the depressions defines a support flute, the support flute including elongated opposing flute walls extending between opposing flute ends.

38. The air return bulkhead of claim 37 wherein at least one of the flute ends is recessed into the front face of the floating panel directly above one of the support columns.

* * * * *

UNITED STATES PATENT AND TRADEMARK OFFICE
CERTIFICATE OF CORRECTION

PATENT NO. : 6,827,534 B2
DATED : December 7, 2004
INVENTOR(S) : Gregory L. Onken It is certified that error appears in the above-identified patent and that said Letters Patent is hereby corrected as shown below:

Column 17,
Line 45, please replace "rest" with -- respect --.

Signed and Sealed this

Thirteenth Day of December, 2005

JON W. DUDAS
*Director of the United States Patent and Trademark Office*